Figure 1:
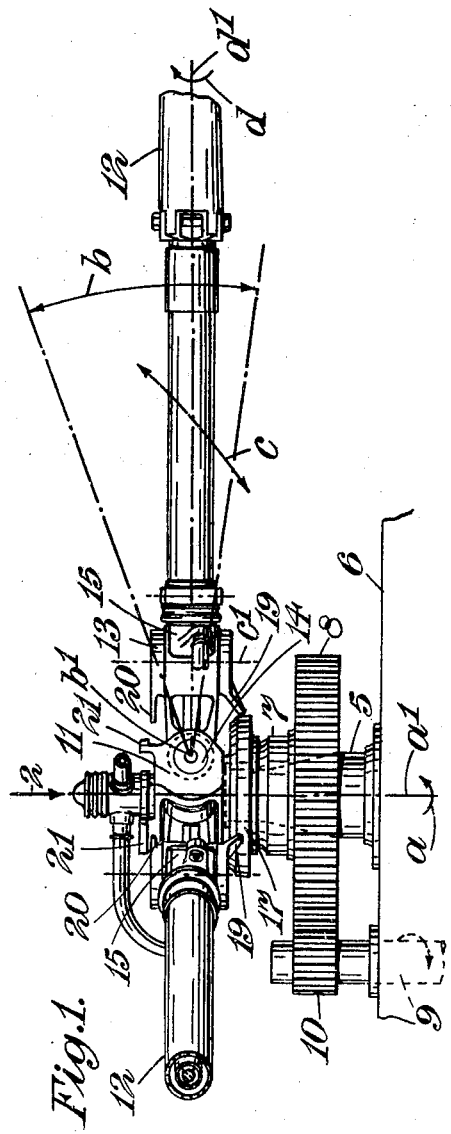

Jan. 10, 1950     R. HAFNER     2,493,869
CONTROL MEANS FOR THE BLADES OF THE SUSTAINING
ROTOR OF A ROTARY-WING AIRCRAFT

Filed June 3, 1947     2 Sheets-Sheet 1

Inventor
Raoul Hafner
by Wilkinson & Mawhinney
Attorneys

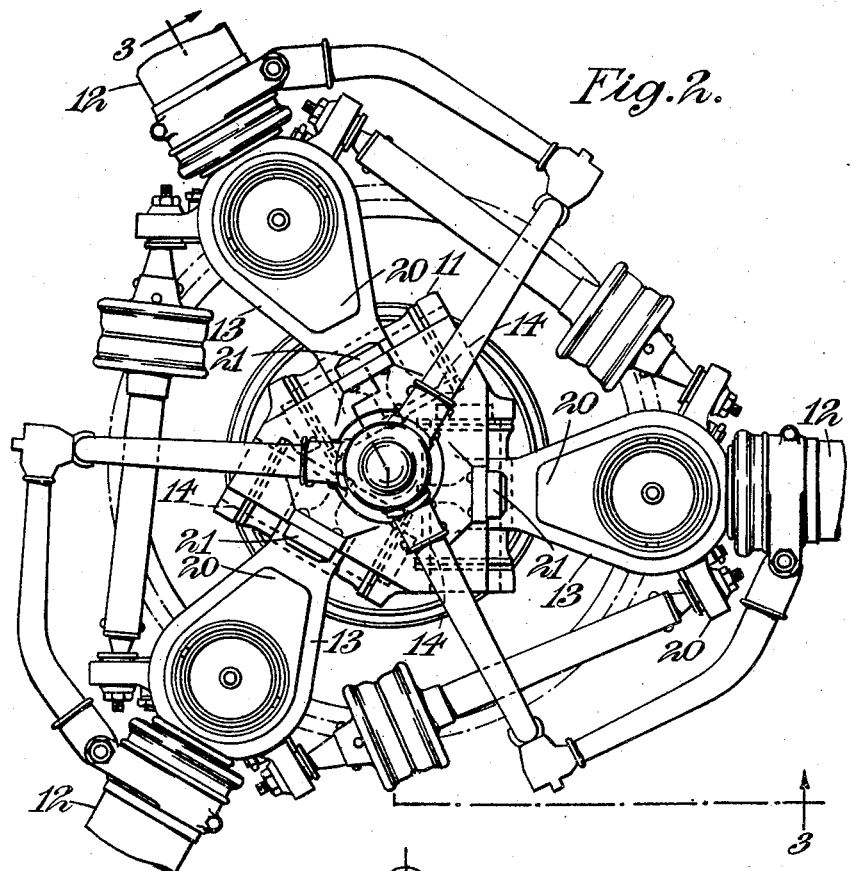
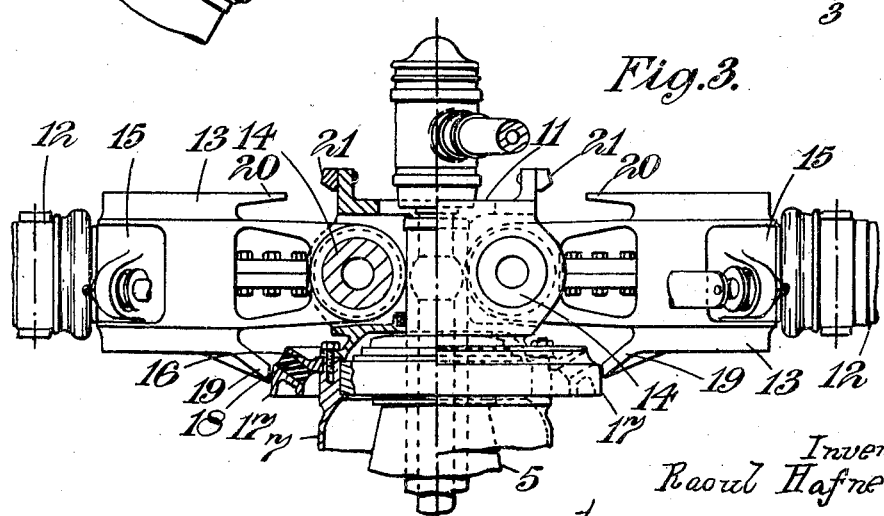

Patented Jan. 10, 1950

2,493,869

UNITED STATES PATENT OFFICE 2,493,869

CONTROL MEANS FOR THE BLADES OF THE SUSTAINING ROTOR OF A ROTARY-WING AIRCRAFT

Raoul Hafner, Bristol, England, assignor to The Bristol Aeroplane Company Limited, Bristol, England, a British company Application June 3, 1947, Serial No. 752,263
In Great Britain May 30, 1946

Section 1, Public Law 690, August 8, 1946
Patent expires May 30, 1966

5 Claims. (Cl. 170—160.52)

This invention concerns rotary-wing aircraft and more particularly helicopters.

In rotary-wing aircraft it is common practice to mount each blade on a rotor hub so that it is capable of independent vertical movements (hereinafter referred to as flapping movements). The flapping movements of the blades vary with variations in the lift and centrifugal force, amongst other factors, and stops are usually provided to limit the amplitude of such movements. During normal flight conditions the blades usually perform their flapping movements between an upper and a lower fixed stop. When the aircraft is at rest (with the rotor stationary or rotating at low speeds) the blades engage the lower stops and are supported by them so that they are kept clear of the fuselage or other part of the machine.

In flight, a blade of the rotor may be struck by a gust so that a downward flapping movement is imparted to it with considerable force. To provide for this contingency the lower stop has heretofore been vertically spaced from the rotor by a considerable amount so that under such adverse conditions the blades does not strike the stop.

The construction of the rotor blades is such that when they are stationary their flexibility results in each blade being downwardly curved towards the aircraft. This requires that the vertical distance between the lower stops and the rotor be small and/or that the stops be disposed at a considerable radial distance from the rotor axis in order to minimise the droop.

Up to now it has therefore been considered necessary in order to allow for adverse flight conditions that the lower stops be vertically spaced from the rotor by a considerable amount and that, in order to counteract the droop of the blades whilst at rest, this vertical distance be made small or that the radial distance to the stops be great.

It is an object of this invention to provide lower stops for the flapping blades which will effectively support the blades whilst they are at rest and in which the vertical distance between the stops and the rotor is small. In this way it is ensured that the height of the rotor above the fuselage is reduced whereby the drag of the aircraft becomes less without increasing the risk of the blades striking the fuselage when they droop.

According to one aspect of the present invention a rotor assembly for a rotary-wing aircraft comprises two or more blades which perform a flapping movement and a stop member common to at least a pair of flapping blades to limit their downward movement, said member being characterised in that on its engagement by other than all of the blades to which it is common it is displaced to allow these blades to move downwardly and upon its engagement by all of the blades to which it is common it is not so displaced and limits the downward movement of all said blades.

According to another aspect of the present invention a rotor assembly for a rotary-wing aircraft wherein the rotor blades each perform a flapping movement, the downward limit of which is determined by a stop member, is characterised in that the stop member is common to all the blades and is resiliently mounted and displaceable on engagement by less than all the blades.

Preferably the stop member comprises a ring which is resiliently mounted for rotation with the rotor hub. The ring may be mounted on a rubber ring or a plurality of rubber blocks or bushes spaced around it or alternatively springs may be provided.

The stop ring and carrier therefor may be provided with surfaces which are inclined with respect to the axis of rotation of the rotor, the resilient material lying between said inclined faces. Preferably the outer peripheral surface of the stop ring is engageable by arms projecting from each blade. Said peripheral surface is preferably disposed at as great a radial distance from the rotor axis as is practicable and may, for example, be disposed so as to lie between the flapping and drag axes of the blades.

In order that the invention may be more fully understood a practical application of it will now be described, by way of example, with reference to the accompanying drawings whereof, Figure 1 is a side elevation of the head of a rotor assembly in accordance with this invention showing certain details in diagrammatic manner, Figure 2 is a view in the direction of arrow 2 of Figure 1, and Figure 3 is a section on the line 3—3 of Figure 2, certain parts being shown in elevation for the sake of clarity.

Referring to Figure 1: a pylon member 5 is attached to the upper surface of the fuselage 6 and supports, by suitable bearings (not shown) a sleeve 7. The sleeve carries a gear 8 and power is transmitted from an engine mounted within the fuselage 6 to a shaft 9 and thence by a pinion 10 to the gear 8 and so to the rotor hub 11, the latter being bolted to the driving sleeve 7. The rotor hub, in known manner, is provided with a plurality of blades 12—in the present case three—each of which independently partakes of several different movements. Thus the blades as a whole rotate in the direction of arrow $a$ about the axis $a'$. Each blade performs a flapping movement $b$ about axis $b'$ and a drag movement $c$ about axis $c'$ whilst the pitch of the blade may be varied by adjusting it in the direction of arrow $d$ about axis $d'$.

To permit of each blade performing the flapping movement $b$ it is attached at its root end to a lug 13 which is pivotally secured to the hub 11 by a pin 14. In practice the blade 12 is attached to the lug 13 through the agency of an element 15 which is pivotally mounted to the lug 13 so that the blade may perform the drag movements about axis $c'$.

Referring now to Figure 3, it will be observed that the upper extremity of the driving sleeve 7 has bolted to it a ring 16. The latter lies immediately below the lugs 13. The downwardly directed surface of the ring 16 is inclined with respect to the long axis of the pylon 5 i. e. with respect to the axis $a'$. A second ring 17 is disposed beneath the first ring and is similarly formed with an inclined face, which, however, is upwardly directed. The two inclined faces are therefore directed towards each other and there is carried between them a rubber ring 18. The ring 18 is bonded to the carrier 16 and has bonded to it the ring 17 so that the latter is supported from the carrier solely by the rubber ring. The ring 17 constitutes one element of a stop which is provided to limit the downward flapping movements of the blades 12.

Each lug 13 is formed with a projecting finger 19 which is generally directed towards the peripheral edge of the stop ring 17, the finger 19 constituting the other element of the stop referred to. As is clear from Figure 1 the peripheral edge of the ring 17 is at a greater radial distance from the axis of rotation of the rotor than the flapping axis $b'$ and is at a lesser distance from the rotor axis than the drag axis $c'$. With this arrangement when a blade 12 drops to a predetermined position the finger 19 will engage the peripheral edge of the stop ring 17 and its further downward movement will be limited as hereinafter described.

The lugs 13 are each formed with a finger 20 on their upper surface which is engaged by a stop 21 carried by the hub 11. The function of the fingers 20 and stops 21 is to limit the upward movement of the blades during flapping.

From what has been said it will be appreciated that when a blade 12 moves downwardly so that its finger 19 engages the stop ring 17 the latter will be displaced sideways i. e. tilted relatively to the carrier ring 16 due to the interposition of the rubber ring 18.

With the arrangement described when the blades 12 are rotating at a certain speed, with a certain setting of the flight controls, the fingers 19 will be raised clear of the stop ring 17. As the rotor comes to rest the blades will all engage the stop ring and will as a result, be held up by it. However, during flight or at other times should one blade only engage the stop ring, the ring is tilted and has no effect in preventing the downward flapping movement of such a blade. Thus, the vertical height from the rotor to the stop ring may be small since if a single blade strikes the stop ring because of adverse flight conditions the ring is displaced. However, the stop is effective to support the blades when all of them engage it so as to maintain the blades clear of the fuselage when they droop.

With the arrangement described the height of the pylon 5 may be reduced and as a consequence the drag of the aircraft may be made less.

It will be clear that instead of the rubber ring 18 springs or rubber bushes or blocks may be provided.

I claim:

1. A rotor assembly for a rotary-wing aeroplane comprising a rotor hub, means to drive the hub, at least two blades carried by the hub for rotation therewith, a hinge member for each blade by which it is attached to the hub for flapping movement, a structure engageable by the blades to limit their downward flapping movement and resilient means by which said structure is supported for rotation with the hub whereby, on flapping of the blades, engagement of the structure by less than all of the blades displaces the structure towards the other blade.

2. A rotor assembly for a rotary-wing aeroplane comprising a rotor hub, means to drive the hub, at least two blades carried by the hub for rotation therewith, a hinge member for each blade by which it is attached to the hub for flapping movement, a structure engageable by the blades to limit their downward flapping movement and resilient means by which said structure is supported for rotation with the hub whereby, on flapping of the blades, engagement of the structure by less than all of the blades displaces the structure towards the other blades.

3. A rotor assembly for a rotary-wing aeroplane comprising a rotor hub, means to drive the hub, at least two blades carried by the hub for rotation therewith, a hinge member for each blade by which it is attached to the hub for flapping movement, a ring beneath the hub and normally disposed co-axially of the axis of rotation of the rotor, resilient means securing the ring to the hub for rotation therewith and permitting limited transverse movements of the ring and a downwardly-directed projection from each blade to engage the edge of said ring, each blade being capable of a downward flapping movement in excess of that at which the blade projection engages the ring thereby to displace the ring towards the other blade projections.

4. A rotor assembly for a rotary-wing aeroplane according to claim 3 wherein the ring has an inwardly directed conical face and a disc-member is carried by the hub said disc having a correspondingly formed conical face, the ring being supported from the disc by a rubber bush secured to said conical faces.

5. A rotor assembly for a rotary-wing aeroplane as claimed in claim 4 wherein the edge of the ring is at a greater radial distance from the axis of rotation of the rotor than the axis about which the flapping movements take place and is at a smaller radial distance than the axis about which the drag movements of the blade take place.

RAOUL HAFNER.

REFERENCES CITED

The following references are of record in the file of this patent:

UNITED STATES PATENTS

| Number | Name | Date |
|---|---|---|
| 1,985,819 | Cierva | Dec. 25, 1934 |
| 2,151,215 | Larsen | Mar. 21, 1939 |
| 2,265,366 | Hafner | Dec. 9, 1941 |
| 2,396,038 | Bossi | Mar. 5, 1946 |
| 2,430,767 | Hirsch | Nov. 11, 1947 |

FOREIGN PATENTS

| Number | Country | Date |
|---|---|---|
| 438,111 | Great Britain | Nov. 12, 1935 |
| 487,811 | Great Britain | June 27, 1938 |